United States Patent
Xu et al.

(10) Patent No.: US 9,568,601 B1
(45) Date of Patent: Feb. 14, 2017

(54) SUCCESSIVE-MFCW MODULATION FOR ULTRA-FAST NARROWBAND RADAR

(71) Applicant: Innophase Inc., Chicago, IL (US)

(72) Inventors: Yang Xu, Chicago, IL (US); Nicolo Testi, Chicago, IL (US); Yuanwei Jin, Salisbury, MD (US)

(73) Assignee: Innophase Inc., San Diego, CA (US)

( * ) Notice: Subject to any disclaimer, the term of this patent is extended or adjusted under 35 U.S.C. 154(b) by 446 days.

(21) Appl. No.: 14/286,937

(22) Filed: May 23, 2014

Related U.S. Application Data (60) Provisional application No. 61/827,587, filed on May 25, 2013.

(51) Int. Cl.
  *G01S 13/42* (2006.01)
  *G01S 13/58* (2006.01)
  *G01S 7/35* (2006.01)

(52) U.S. Cl.
  CPC .............. *G01S 13/584* (2013.01); *G01S 7/354* (2013.01); *G01S 2007/358* (2013.01)

(58) Field of Classification Search
  CPC .. G01S 13/584; G01S 7/354; G01S 2007/358; G01S 13/26; G01S 13/36; G01S 13/84
  USPC .......................................... 342/109, 112, 127
  See application file for complete search history.

(56) References Cited

U.S. PATENT DOCUMENTS

| | | | |
|---|---|---|---|
| 3,750,171 A | 7/1973 | Faris | |
| 3,790,940 A * | 2/1974 | Becker | G01S 13/84 342/125 |
| 4,024,540 A * | 5/1977 | Ofverberg | G01S 13/36 342/102 |
| 2012/0122485 A1* | 5/2012 | Bartlett | G01S 5/0284 455/456.1 |
| 2014/0085132 A1* | 3/2014 | Jirskog | G01F 23/284 342/124 |

FOREIGN PATENT DOCUMENTS

JP   2002323556 A   * 11/2002

OTHER PUBLICATIONS

Lee et al., "A Fully-Integrated 77-GHz FMCW Radar Transreceiver in 65-nm CMOS Technology", IEEE Journal of Solid-State Circuits, vol. 45, No. 12, Dec. 2010, pp. 2746-2756.

* cited by examiner

*Primary Examiner* — John B Sotomayor
(74) *Attorney, Agent, or Firm* — Invention Mine LLC (57) ABSTRACT

Determining a speed and a range of an object by generating at least a first, second, and third interval-specific tone phase signals associated with at least three successive time intervals, wherein at least two of the generated and transmitted tones are different frequencies; determining at least a first, second and third interval-specific average phase value from the respective interval-specific tone phase signals; and then determining a range estimate of the object and determining a speed estimate of the object using at least two phase differences between the at least first, second and third interval-specific average phase values.

20 Claims, 4 Drawing Sheets

SUCCESSIVE-MFCW MODULATION FOR ULTRA-FAST NARROWBAND RADAR

CROSS REFERENCES

This application claims priority from and is a non-provisional of U.S. Provisional Patent Application No. 61/827,587, filed May 25, 2013, entitled "Successive-MFCW Modulation for Ultra-Fast Narrowband Radar", the entire disclosure of which is incorporated by reference herein for all purposes.

Statement of Rights to Inventions Made Under Federally Sponsored Research. This work was supported by the government, in part, by a grant from the U.S. Army Research Laboratory, the Office of Naval Research and the Army Research Office under grant no. W911NF-11-1-0160. The U.S. government may have certain rights to this invention.

BACKGROUND OF THE INVENTION

Real time scanning surveillance radar systems can be used in many commercial applications, such as automotive radar and human feature extraction. Typical scanning radars often operate under the constraint of only a limited number of pulses, thus real time estimation and detection of radar targets are quite difficult due to short dwell time (i.e., the time that an antenna beam spends on a target). Moreover, as modern radar systems are becoming increasingly sophisticated, systems with low hardware complexity and low cost while still achieving comparable high range and speed accuracy and high resolution are in strong demand.

For modern radars, frequency or phase modulation is normally needed to achieve desired radar performance. For example, the Frequency Modulated Continuous Wave (FMCW) technique is widely used due to its good range and velocity resolution. However its resolution is inversely proportional to the signal bandwidth and it requires a long sampling window, hence a long dwell time, to complete a range measurement.

Furthermore, FMCW radars usually use Fast Fourier Transform (FFT) to estimate Doppler frequencies, which results in high hardware complexity and high power consumption. The Multi Frequency Continuous Wave (MFCW) is another modulation scheme that continuously transmits multiple frequency tones in parallel with each other. The phases of the returned signals are compared to obtain a range estimate. This technique allows a really short dwell time and a very small signal bandwidth. However, one transceiver is needed for each frequency tone, making the MFCW radar very costly in implementation and not suitable for large-scale phased array integration. Prior work on radar modulation schemes such as the above-mentioned FMCW and MFCW still face the challenges of balancing trade-offs of excellent radar performance against high hardware complexity and cost.

Accordingly, there is a need for improved radar modulation formats and signal processing.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Described herein are embodiments of various Successive-MFCW (S-MFCW) modulation schemes suitable for high-speed radar estimation and detection and large-scale integration for phased arrays. Unlike the typical MFCW modulation, the S-MFCW method sequentially transmits several frequency tones from the same transceiver. Thus it results in comparable dwell time and signal bandwidth to the MFCW method, while drastically reducing the hardware complexity and enabling its use in large phased array systems. Although the successive transmission of the tones imposes constraints on the system performances such as range and velocity ambiguity, custom tone sequences can be devised for practical applications. In one embodiment, a numerical simulation of a 77 GHz automotive radar is provided as an example to verify the performance and noise impact of the proposed scheme.

In one embodiment, an apparatus comprises: a variable transmit tone generator configured to sequentially generate a plurality of transmit tones having at least two different frequencies for illuminating an object; a receiver configured to sequentially demodulate a corresponding sequence of a plurality of echo signals and configured to sequentially generate a plurality of tone phase signals; an analog to digital converter configured to sample the sequentially generated plurality of tone phase signals; a processing device configured to determine a plurality of average phase values for each of the sampled sequentially generated plurality of tone phase signals, and configured to determine an object velocity estimate and an object range estimate based on differences between pairs of average phase values selected from the plurality of average phase values.

In a further embodiment, a method of determining a speed and a range of an object is provided, and includes generating at least a first, second, and third interval-specific tone phase signal by, during each of at least three successive time intervals: (i) generating and transmitting a tone towards an object during a respective time interval; (ii) receiving an echo signal from the object during the respective time interval; and (iii) demodulating the respective echo signal using the generated tone to generate an interval-specific tone phase signal; wherein at least two of the generated and transmitted tones are different frequencies; determining at least a first, second and third interval-specific average phase value from the respective interval-specific tone phase signals; and then determining a range estimate of the object and determining a speed estimate of the object using at least two phase differences between the at least first, second and third interval-specific average phase values.

Figure 1:
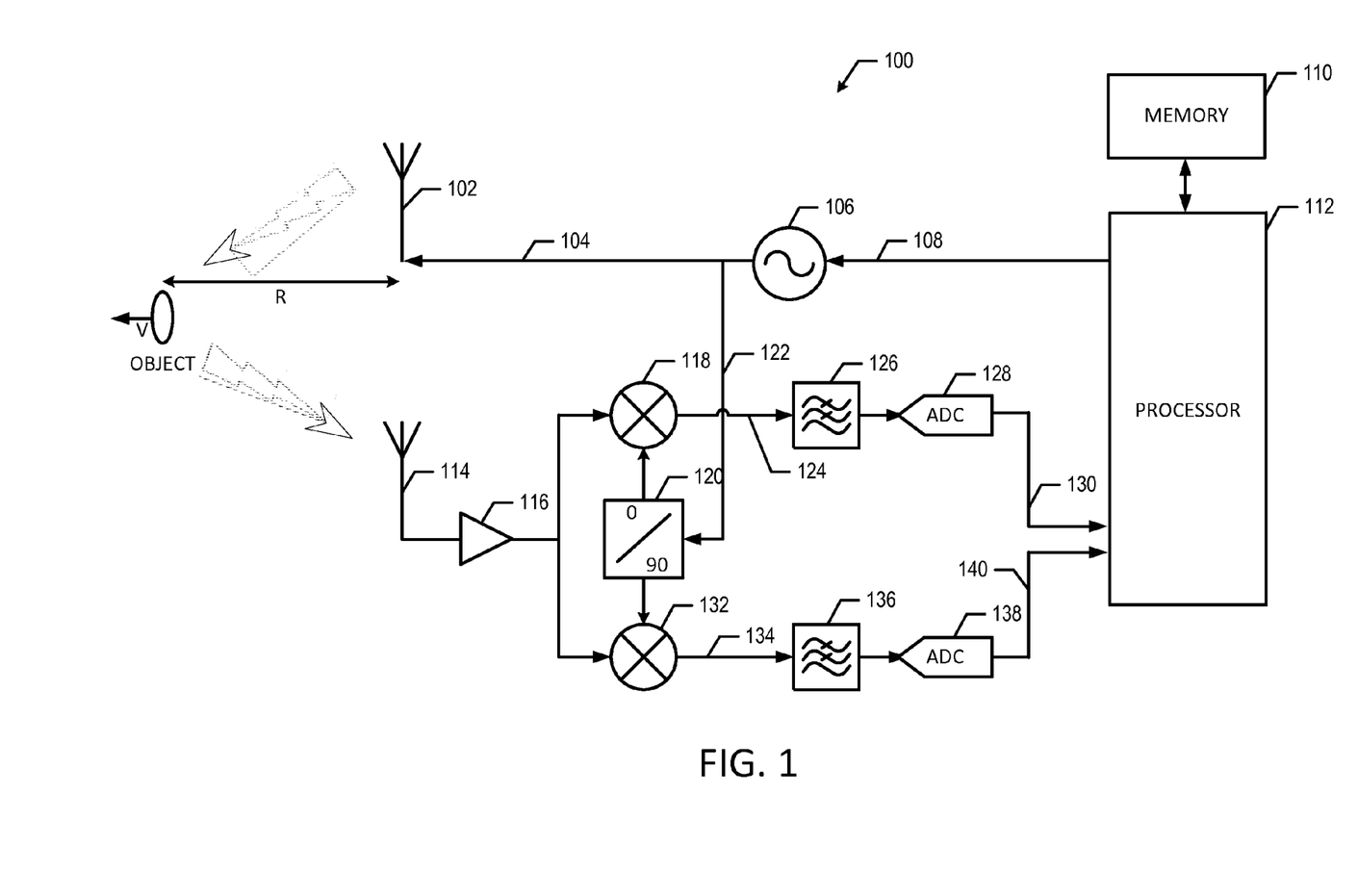
FIG. 1 is a block diagram of a successive frequency radar transceiver in accordance with some embodiments.

FIG. 1 is a block diagram of one embodiment of a radar transceiver 100. The processor 112, operating in conjunction with memory device 110, generates a frequency control signal 108 to control the transmit tone generator 106 (e.g., an oscillator), which generates a transmit signal 104 for transmission to an object (at a distance, or range R, traveling at a velocity V) by transmit antenna 102. Thus, the tone generator 116 may be a variable transmit tone generator configured to sequentially generate a plurality of transmit tones having at least two different frequencies for illuminating an object.

The receive antenna 114 receives the signal and provides it to the receiver, which may include a low noise amplifier 116, and a demodulator for generating a tone phase signal, which is the low pass Doppler component of the received echo for the given transmit tone, such as quadrature demodulator including an inphase or I channel mixer 118, and quadrature, or Q-channel mixer 132, for providing an inphase tone phase signal 124 and quadrature tone phase signal 134, respectively. The receiver is therefore configured to sequentially demodulate a sequence of echo signals, and is configured to sequentially generate a plurality of tone phase signals.

The other inputs to the mixers 118 and 132 are the transmit tone 122 that is provided to mixer 118 via phase shifter 120 (without a phase shift) and to mixer 132 via phase shifter 120, with a 90° phase shift. Each of the inphase and quadrature signals are low pass filtered by low pass filters 126 and 136, respectively, and the signals are then sampled by analog to digital converter 128/138. The analog to digital converter is therefore configured to sample the sequentially generated plurality of tone phase signals. The sampled I and Q signals 130, 140, are then provided to the processor 112. The processing device of processor 112 and memory 110 are configured to determine a plurality of average phase values for each of the sampled tone phase signals, and configured to determine an object velocity estimate and an object range estimate based on differences between pairs of average phase values as described in further detail below.

In some embodiments described herein, an apparatus may comprise a variable transmit tone generator configured to sequentially generate a plurality of transmit tones having at least two different frequencies for illuminating an object; a receiver configured to sequentially demodulate a corresponding sequence of a plurality of echo signals and configured to sequentially generate a plurality of tone phase signals; an analog to digital converter configured to sample the sequentially generated plurality of tone phase signals; and a processing device configured to determine a plurality of average phase values for each of the sampled sequentially generated plurality of tone phase signals, and configured to determine an object velocity estimate and an object range estimate based on differences between pairs of average phase values selected from the plurality of average phase values.

In some embodiments, the processor is interconnected to the variable transmit tone generator and is further configured to generate a frequency control signal. Still further, in some embodiments, the receiver comprises an inphase/quadrature demodulator. In some embodiments, the processing device comprises a processor and a tangible memory storage device for storing computer-readable instructions. In other embodiments, it may include an ASIC, or FPGA device configured to implement the methods described herein. The processor may be configured to determine each of the plurality of average phase values at a predetermined time offset, and may be configured to determine the object velocity estimate based on a pair of average phase values of the plurality of average phase values, wherein the pair of average phase values correspond to a pair of tone phase signals corresponding to a pair of transmit tones having a same frequency. The processor may be further configured to determine the object range estimate using a coarse range estimate and a fine range estimate as described herein.

One of skill in the art will understand that the block diagram of radar transceiver FIG. 1, is a simplification of a suitable architecture, and various embodiments may include alternative forms and architectures, the variations of which are not significant to the apparatus and methods described herein.

Figure 2:
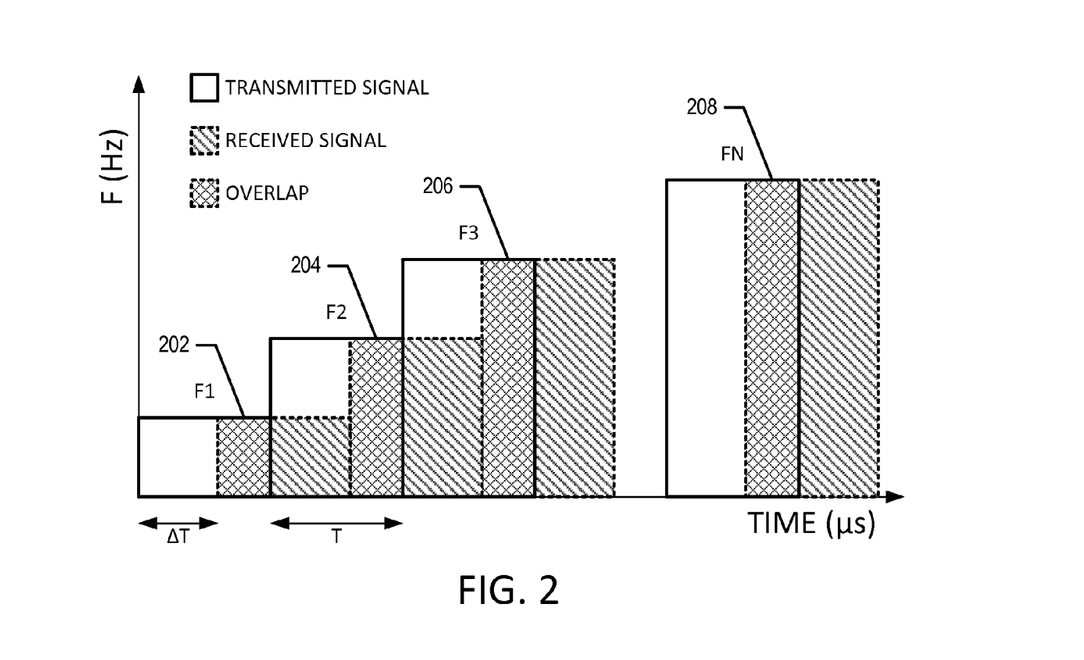
FIG. 2 is a depiction of a modulation format used in methods and apparatuses for estimating speed and range of an object in accordance with some embodiments.

The transmitted S-MFCW signal may take the form of a sequence of N frequency tones ($f_1, \ldots f_N$). In some embodiments, each tone may be transmitted during an interval, each interval or pulse width of duration T, as shown in FIG. 2. The transmit signal can be modeled as:

$$s(t) = \sum_{i=1}^{N} \exp(j2\pi f_i t + j\phi_i(t)) \cdot rect[(t - (2i-1)T/2)/T]$$

where the rectangular function is given as:

$$rect(t) = \begin{cases} 0, & |t| > 0.5 \\ 0.5, & |t| = 0.5 \\ 1, & |t| < 0.5 \end{cases}$$

and $\phi_i(t)$ represents the initial random phase noise of each tone. The i-th transmitted signal at frequency $f_i$ is reflected from the target, or object, and is detected by the receiver 100 after a delay starting at $$t = \Delta t_i = \Delta t((i-1)T).$$

Consider a target located at the beginning of the measurement at a distance R, and moving in the direction of the radar beam at a constant speed v. The speed is considered positive if the target moves away from the radar. Thus, because the transmitted signal is an exponential function, a delay that includes the Doppler contribution may take the form:

$$\Delta t(t) = 2 \cdot (R + v \cdot t)/c,$$

where c is the speed of light. Then the returned signal at the receiver antenna is:

$$r(t) = A \cdot s(t - \Delta t(t)) + n(t)$$

-continued $$= \sum_{i=1}^{N} \{A \cdot \exp[j2\pi f_i(t - \Delta t(t)) + j\phi_i(t - \Delta t(t))] + n_i(t)\} \cdot$$

$$rect[(t - \Delta t_i - (2i-1)T/2)/T],$$

where A represents the propagation and reflection losses and n(t) is the additive Gaussian noise. A has been assumed constant for each tone for a narrowband system where $$(f_1 \approx f_2 \approx \ldots \approx f_N)$$

We assume that n(t) can be decomposed into N independent components, with $n_i$(t) referring to a white bandpass Gaussian random process with zero mean and variance $\sigma^2$ due to signal return from the i-th tone. The received signal r(t) will undergo processing to extract the phase information for range and speed estimation. To that end, the received signal is multiplied by the transmitted signal for demodulation, i.e., r(t)*·s(t), where (·)* is the phase conjugation, followed by a low-pass filter, yielding the post-processed signal:

$$u(t) = \sum_{i=1}^{N} \left\{ [A \cdot \exp(j2\pi f_i \Delta t(t)) + n'_i(t)] \cdot rect\left[\frac{t - (\Delta t_i + T)/2 - (i-1)T}{T - \Delta t_i}\right] \right\}.$$

$\eta'_i$(t) follows a Gaussian distribution with zero mean and variance $\sigma^2$. The $\phi_i$(t) contribution disappears because the received phase noise is correlated to the transmitted phase noise. From the expression for u(t), it can be noted that for each tone the received signal can be sampled only during the period of overlap between the transmitted and received signals, as shown by the overlap portions 202, 204, 206, 208 of FIG. 2. In particular, FIG. 2 shows a plurality of transmission intervals of duration T, during which a tone of frequency F1, F2, F3, or generally FN is transmitted. The returning echo signal is returned after a delay $\Delta T$.

To analyze the impact of the noise, it may be modeled for the $i^{th}$ frequency tone as:

$$n'_i(t) = \alpha_i(t)\exp[j\psi_i(t)],$$

where $\alpha_i$ (t) denotes the envelop of the noise and follows a Rayleigh distribution, while $\psi_i$ (t) represents the phase of the noise and has a uniform distribution within [0, 2π]. Next, we define the phase of each tone of the post-processed signal without noise as: $\Phi_i$ (t)=2π$f_i$ $\Delta$t(t). Then, combining equations provides:

$$u(t) = \sum_{i=1}^{N} \left\{ [A \cdot \exp(j\Phi_i t(t)) + \alpha_i(t)\exp(j\psi_i(t))] \cdot rect\left[\frac{t - (\Delta t_i + T)/2 - (i-1)T}{T - \Delta t_i}\right] \right\}.$$

Hence, the phase of the $i^{th}$ frequency tone of the received signal can be derived as:

$$\hat{\Phi}_i(t) = \Phi_i(t) + \text{phase}\{A + \alpha_i(t) \cdot \exp[j(\psi_i(t) - \Phi_i(t))]\}$$

$$\approx \Phi_i(t) + \tan^{-1}\left\{\frac{\alpha_i(t) \cdot \sin[\psi_i(t) - \Phi_i(t)]}{A + \alpha_i(t) \cdot \cos[\psi_i(t) - \Phi_i(t)]}\right\}$$

-continued $$\approx \Phi_i(t) + \frac{\omega_i(t)}{A},$$

where $$w_i(t) = \alpha_i(t) \cdot \sin[\psi'_i(t)],$$

$$\psi'_i(t) = \psi_i(t) - \Phi_i(t).$$

$\psi_i$(t) has a uniform distribution between [0, 2π]. So $w_i$(t) follows a Gaussian distribution with zero mean and variance $\sigma^2$. In the above derivation the approximation $\tan^{-1}$ (x)≈x is used under the assumption that $$A >> \alpha_i(t) \cdot \cos(\psi'_i(t)); A >> \alpha_i(t) \cdot \sin(\psi'i(t))$$

which correspond to assuming either a medium or a high signal to noise ratio.

Next, let $f_s$ denote the sampling rate during the overlap interval (i−1)T+$\Delta t_i$≤t≤iT, the number of samples is given by: $N_s$=(T−$\Delta t_i$)·$f_s$. Hence the average of the phase of the $i^{th}$ tone during the overlap interval can be calculated by:

$$\overline{\Phi}_i = \frac{1}{N_s} \cdot \sum_{k=1}^{N_s} \hat{\Phi}_s(\Delta t_i + (i-1)T + (k-1)/f_s)$$

$$= 4\pi f_i \frac{R}{c} + 2\pi f_i \frac{v}{c}\left[\Delta t_i + (2i-1)T - \frac{1}{f_s}\right] + \frac{\overline{w}_i}{A},$$

where $\overline{w}_i$ is the average of the noise during the overlap interval for the $i^{th}$ tone and follows a Gaussian distribution with zero mean and variance $\sigma^2/N_s$. Since $\Delta t_i$ depends on the range and the speed of the target, it cannot be known in advance and it changes at every tone. To deal with this problem, we define a fixed start time for the sampling window of the return signal based on a pre-determined maximum range $R_{max}$ so that $\Delta t_{max}$=2$R_{max}$/c≥$\Delta t_i$.

Then, using $\Delta t_{max}$ instead of $\Delta t_i$, the phase signal becomes $$\overline{\Phi}_i(t) = 4\pi f_i \frac{R}{c} + 2\pi f_i \frac{v}{c}\left[\Delta t_{max} + (2i-1)T - \frac{1}{f_s}\right] + \frac{\overline{w}_i}{A} = \tilde{\Phi}_i(t) + \frac{\overline{w}_i}{A},$$

where the average phase value, ignoring the noise component, is:

$$\tilde{\Phi}_i(t) = 4\pi f_i \frac{R}{c} + 2\pi f_i \frac{v}{c}\left[\Delta t_{max} + (2i-1)T - \frac{1}{f_s}\right].$$

In one embodiment, an algorithm for range and speed estimation may use an average delay $\bar{t}_i$ for the $i^{th}$ tone, $$\bar{t}_i = \frac{\tilde{\Phi}_i(t)}{2\pi f_i} = 2\frac{R}{c} + \frac{v}{c}\left[\Delta t_{max} + (2i-1)T - \frac{1}{f_s}\right]$$

Using two different tones i and j, the difference may be determined:

$$\bar{t}_i - \bar{t}_j = 2v(i-j)T/c.$$

and the speed may be calculated as:

$$v = \frac{c(\bar{t}_i - \bar{t}_j)}{2(i-j)T} = \frac{c}{2(i-j)T} \cdot \frac{f_j \cdot \tilde{\Phi}_i - f_i \cdot \tilde{\Phi}_j}{f_i \cdot f_j}.$$

However we should note that the phase measurement is wrapped. The phase constraint $\Phi_i \leq 2\pi$ must be imposed in order to avoid ambiguous estimation of speed and range. This requirement is stringent, as it would make the maximum unambiguous range be $\lambda/2$. Therefore, in an alternative embodiment based on the above expression for $\tilde{\Phi}_i$, an algorithm may use the general expression for a phase difference defined as follows:

$$\Delta \tilde{\Phi}_{ij} = \tilde{\Phi}_i - \tilde{\Phi}_j = 4\pi \frac{R}{c}(f_i - f_j) +$$
$$2\pi \frac{v}{c}\left(\Delta t_{max} - \frac{1}{f_s}\right)(f_i - f_j) + 2\pi \frac{v}{c}T[(2i-1)f_i - (2j-1)f_j],$$

which yields a more relaxed constraint $\Delta \tilde{\Phi}_{ij} \leq 2\pi$.

This makes the maximum range in the case of v=0 to be:

$$R_{max} = c/[2(f_i - f_j)].$$

Because the expression for $\Delta \tilde{\Phi}_{ij}$ above has two unknowns R and v, two different equations are needed to solve the system. That is, two sets of $\Delta \tilde{\Phi}_{ij}$ with two different ($f_i - f_j$). Therefore, in one embodiment, three frequencies are used. In one embodiment, two of the frequencies may be the same, in which case the expression for $\Delta \tilde{\Phi}_{ij}$ simplifies to:

$$\Delta \tilde{\Phi}_{ij} = \tilde{\Phi}_i - \tilde{\Phi}_j = 4\pi v T f_i(i-j)/c.$$

In these embodiments, the velocity may then be determined according to:

$$v = \frac{c(\tilde{\Phi}_i - \tilde{\Phi}_j)}{4\pi(i-j)Tf_i}.$$

In order to determine if the target is moving with a positive or a negative speed relative to the radar beam direction, we need to consider $\Delta \tilde{\Phi}_{ij}$ in the interval $[-\pi, \pi]$. Using the value of $\pi$ to replace $\Delta \tilde{\Phi}_{ij}$ as the maximum difference in phase, we can calculate the maximum detectable speed:

$$v_{max} = c/[4(i-j)Tf_i].$$

Because the speed has been calculated using tones i and j, ($f_i = f_1$), the range can be determined using the estimated speed and the general expression for the phase difference using tones j and k ($f_j \neq f_k$). In this case the phase is considered in the range of $[0, 2\pi]$. The range may then be determined using a difference of two average phase values and the estimated speed v, and the timing of the various measurements according to:

$$R = \frac{c(\tilde{\Phi}_j - \tilde{\Phi}_k)}{4\pi(f_j - f_k)} - \frac{v}{2}\left(\Delta t_{max} - \frac{1}{f_s}\right)\frac{v}{2}T\left[\frac{(2j-1)f_j - (2k-1)f_k}{f_j - f_k}\right].$$

The noise of the measurements may also be considered. To calculate the speed in the presence of noise, one may replace $\Delta \tilde{\Phi}_{ij}$ by $\Delta \hat{\Phi}_{ij}$ to obtain:

$$\hat{v} = \frac{c(\hat{\Phi}_i - \hat{\Phi}_j)}{4\pi(i-j)Tf_i} = v + \frac{c}{4\pi(i-j)Tf_i} \cdot \left(\frac{\bar{w}_i - \bar{w}_j}{A}\right) = v + \frac{c}{4\pi(i-j)Tf_i} \cdot \frac{\bar{w}_v}{A},$$

where $\bar{w}_v$ follows a Gaussian distribution with zero mean and variance $2\sigma^2/Ns$, and it is defined as:

$$\bar{w}_v = \bar{w}_i - \bar{w}_j.$$

Similarly, the range estimation in the presence of noise is given by:

$$\hat{R} = \frac{c(\hat{\Phi}_j - \hat{\Phi}_k)}{4\pi(f_j - f_k)} - \frac{\hat{v}}{2}\left(\Delta t_{max} - \frac{1}{f_s}\right) - \frac{\hat{v}}{2}T\left[\frac{(2j-1)f_j - (2k-1)f_k}{f_j - f_k}\right].$$

Because f is the carrier frequency, $$f_i \approx f_j \approx f_k$$

and therefore, $$\hat{R} =$$
$$R + \frac{c}{4\pi(f_i - f_k)} \cdot \left\{\frac{\bar{w}_j - \bar{w}_k}{A} - \frac{\bar{w}_v}{A} \cdot \left[\frac{1}{2}\left(\Delta t_{max} - \frac{1}{f_s}\right) \cdot \frac{f_j - f_k}{(i-j)Tf_i} + \frac{j-k}{i-j}\right]\right\} =$$
$$R + \frac{c}{4\pi(f_j - f_k)} \cdot \frac{\bar{w}_R}{A},$$
$$\bar{w}_R = \bar{w}_j - \bar{w}_k - \bar{w}_v \cdot \left[\frac{1}{2}\left(\Delta t_{max} - \frac{1}{f_s}\right) \cdot \frac{f_j - f_k}{(i-j)Tf_i} + \frac{j-k}{i-j}\right].$$

where $\bar{w}_R$ follows a Gaussian distribution with zero mean and variance given by:

$$\sigma_{\bar{w}_R}^2 = \frac{2\sigma^2}{Ns}\left\{1 + \left[\frac{1}{2}\left(\Delta t_{max} - \frac{1}{f_s}\right) \cdot \frac{f_i - f_k}{(i-j)Tf_i} + \frac{j-k}{i-j}\right]^2\right\}.$$

The error on the speed and range measurement due to noise may be calculated as:

$$v_{err} = \hat{v} - v = \frac{c}{4\pi(i-k)Tf_i} \cdot \frac{\bar{w}_v}{A},$$
$$R_{err} = \hat{R} - R = \frac{c}{4\pi(f_j - f_k)} \cdot \frac{\bar{w}_R}{A}.$$

and the expression for the error variance of the speed and range estimates are, respectively:

$$\sigma_{v_{err}}^2 = \left(\frac{c}{4\pi(i-j)Tf_i}\right)^2 \cdot \frac{1}{Ns} \cdot \frac{1}{SNR}$$
$$\sigma_{R_{err}}^2 =$$
$$\left(\frac{c}{4\pi(f_j - f_k)}\right)^2\left\{1 + \left[\frac{1}{2}\left(\Delta t_{max} - \frac{1}{f_s}\right) \cdot \frac{f_i - f_k}{(i-j)Tf_i} + \frac{j-k}{i-j}\right]^2\right\} \cdot \frac{1}{Ns} \cdot \frac{1}{SNR},$$

where $SNR = A^2/(2\sigma^2)$.

These equations reveal that a large number of samples and a high SNR will reduce the error both on the speed and range estimation. A high carrier frequency and a long pulse width are necessary to reduce the noise variance on the speed.

However, a reduction of noise variance comes with a trade off with the maximum detectable speed. Furthermore, both the speed and the range are deterministic unknowns with additive Guassian noise of zero mean. Hence the maximum likelihood estimator (MLE) is the optimum unbiased estimator to obtain the estimates for speed and range. So the error variances that are given above achieve the classic Cramer-Rao lower bound.

Figure 3:
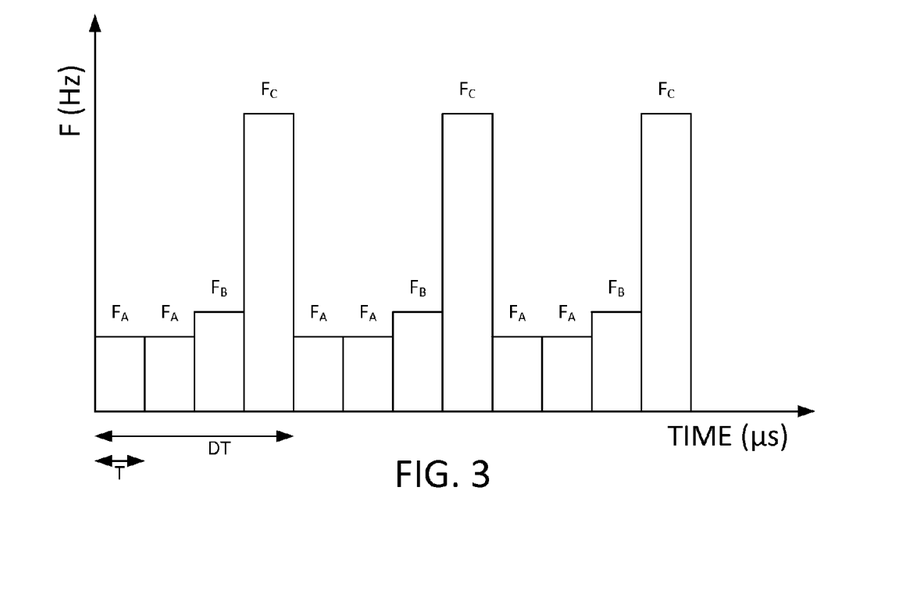
FIGS. 3 and 4 are depictions of alternative modulation formats in accordance with some embodiments.
Figure 4:
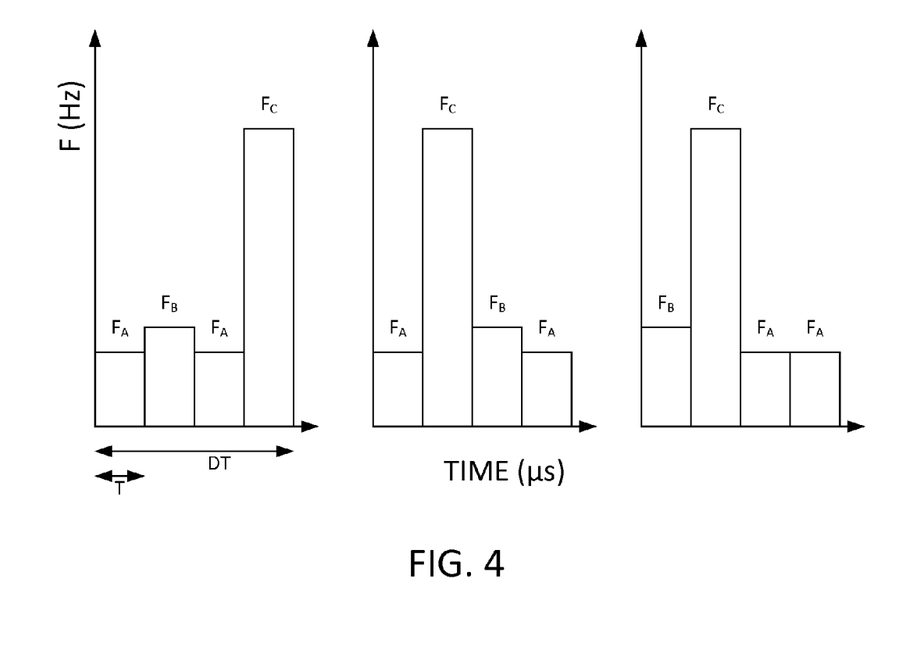

With respect to FIG. 3, one embodiment of a radar transmission format is described. During each of four intervals of duration T, tones are transmitted (one tone per interval). In this embodiment, the first two intervals contain tones having the same frequency $F_A$. The average phase values of the demodulated signals from these first two intervals may be used to determine a speed estimate of the object. The third interval includes a tone having a frequency $F_B$ while a tone having a frequency $F_C$ is transmitted during the fourth interval. Note that $F_B$ is closer to the first frequency $F_A$ than $F_C$ is to $F_A$. The signaling sequence may then be repeated to obtain additional speed and range measurements. With respect to FIG. 4, alternative sequences of tone frequency transmissions are depicted with respect to alternative embodiments.

Figure 5:
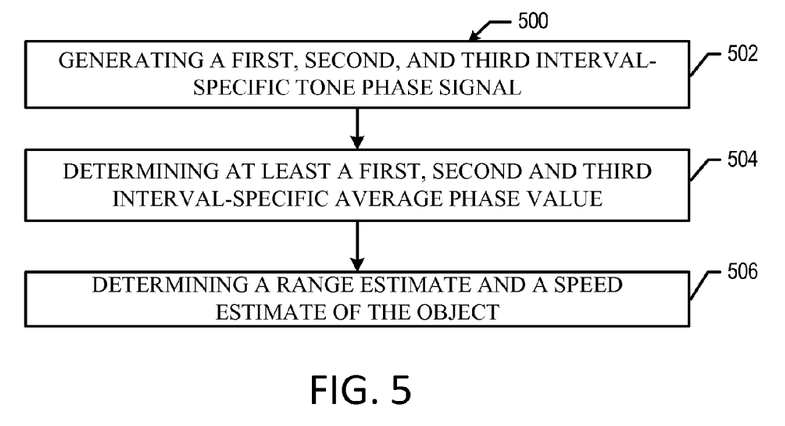
FIGS. 5 and 6 are flowcharts of methods of determining speed and range estimates in accordance with some embodiments.

A method 500 of determining a speed and a range of an object will be described with reference to FIG. 5. At 502, the method may comprise generating at least a first, second, and third interval-specific tone phase signals. That is, the intervals are sequential in nature, meaning that the time intervals are successive, or one after the other. During each of the intervals, the method includes the following (i) generating and transmitting a tone towards an object during a respective time interval; (ii) receiving an echo signal from the object during the respective time interval; and (iii) demodulating the respective echo signal using the generated tone to generate an interval-specific tone phase signal. As described herein, at least two of the generated and transmitted tones are different frequencies. The method may be implemented wherein two tones may have the same frequency, and a third tone will have a different frequency. Alternatively, tones having three separate frequencies may be transmitted.

At 504, the method includes determining at least a first, second and third interval-specific average phase value. The average phase values are formed from the respective interval-specific tone phase signals, which is the respective echo signal that is demodulated with its corresponding transmit tone during the overlap period. As used herein, many of the time parameters are simplified through the use of a standardized interval period T. This is done to provide simplified equations, wherein relative times can be determined using the time slot index, i, j, k, etc. In some embodiments, the three successive time intervals are equal in duration.

However, the relationships described herein may be generalize to non-uniform time intervals, and thus the term "interval-specific" may mean simply that a measurement, such as an average phase value, has a particular time or time offset associated with it. The method includes embodiments where the adjacent time intervals are of unequal duration. In still other embodiments, interval-specific may simply refer to an interval number if using a predefined timing relationships for intervals.

Further, as described herein, the offset time of the average phase value measurement is related to the maximum range. As one example of non-standard time intervals, when using two average phase measurements of a single frequency to determine an estimated velocity, the second average phase measurement may have a greater or lesser time offset. While the interval between these measurements may have a maximum value to prevent ambiguity associated with a phase wrapping of the tone signal, it could have a smaller value. It is noted however, that having the measurements too closer together may result in a noisier estimate of the speed, while average phase measurements that are farther apart may have less noise.

At 506, the method includes determining a range estimate of the object and determining a speed estimate of the object. As described herein, the difference in average phase values may be used. In particular, using at least two phase differences between the at least first, second and third interval-specific average phase values.

The method 500 may use at least two tones of a same frequency, and the first interval-specific average phase value and the second interval-specific average phase value correspond to the at least two tones, and, wherein determining a range and determining a speed of the object further comprises determining the velocity based on a first phase difference between the first and second interval-specific average phase values.

The method 500 of some embodiments may have at least two tones of a same frequency transmitted in adjacent time intervals, although other embodiments include wherein the at least two tones of a same frequency are transmitted in non-adjacent time intervals.

The method 500 may include generating at least a first, second, and third interval-specific tone phase signal that further comprises generating a fourth interval-specific tone phase signal by, in a fourth time interval: (i) generating and transmitting a fourth tone towards the object; (ii) receiving a fourth echo signal from the object; (iii) demodulating the fourth echo signal using the generated fourth tone to generate a fourth interval-specific tone phase signal; wherein the fourth tone has a frequency different from any other transmitted tone; determining a fourth interval-specific average phase value from the respective interval-specific tone phase signals; and wherein determining a range estimate of the object comprised determining a coarse range estimate using at least two phase differences between the at least first, second and third interval-specific average phase values and determining a fine range estimate using a phase difference between the fourth interval-specific average phase value and one of the at least first, second and third interval-specific average phase values.

The method 500 may include determining the at least a first, second and third interval-specific average phase values by sampling each of the respective interval-specific tone phase signals over a predetermined interval and averaging the respective sample values.

Figure 6:
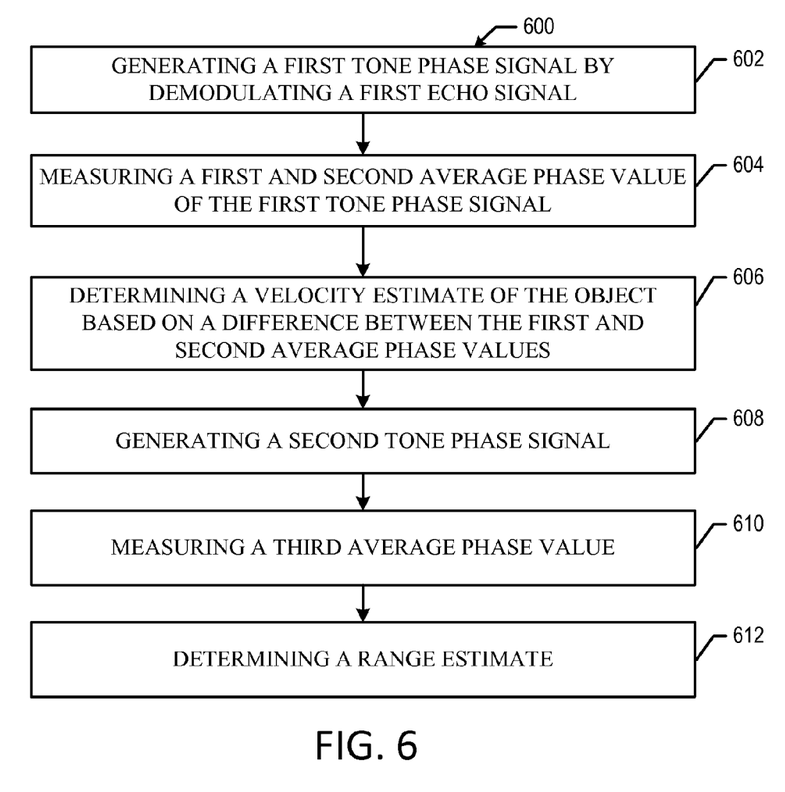

A method 600 will be described with respect to FIG. 6. The method 600 may comprise generating at 602 a first tone phase signal by demodulating a first echo signal from an object using a transmitted first tone having a first frequency. At 604 the method includes measuring a first and second average phase value of the first tone phase signal. The measurements are performed at a first and second time offset, respectively. In one embodiment, the offset is a maximum time value that accommodates the latest overlap period associated with a maximum range. At 606, the method 600 includes determining a velocity estimate of the object based on a difference between the first and second average phase values. The calculation takes into account the first and second time offsets, whether they are at regular intervals or at other times. In particular, the first and second average phase values may be from adjacent intervals, or from non-adjacent intervals. The first and second average phase values, are however, associated with a transmit tone of the same frequency.

The method 600 includes at 608 generating a second tone phase signal by demodulating a second echo signal from the object using a transmitted second tone having a second frequency different than the first frequency. At 610, the method 600 includes measuring a third average phase value of the second tone phase signal at a third time offset. Finally, at 612, the method 600 includes determining a range estimate of the object based on the velocity estimate from 606 and a difference between the third average phase value and at least one of the first and second average phase values.

In further embodiments to improve a range estimate, the method 600 may further comprise generating a third tone phase signal by demodulating a third echo signal from an object using a transmitted third tone having a third frequency; measuring a fourth average phase value of the third tone phase signal at a fourth time offset; and determining a revised range estimate of the object based on the velocity estimate and a difference between the fourth average phase value and at least one of the first, second, and third average phase values.

The method 600 may include embodiments where the transmitted first tone is transmitted during a time interval that is substantially twice as long (e.g., within a few microseconds) as a time interval during which the transmitted second tone is transmitted.

The method 600 may also include embodiments wherein the transmitted second tone is transmitted during a time interval between the two-non consecutive time intervals of the transmitted first tone.

To demonstrate the performances of some of the embodiments of the S-MFCW modulation and methods described herein, the design configuration and requirements of a 77 GHz automotive radar given in the following publication are used: J. Lee, Y. A. Li, M. H. Hung, and S. J. Huang, "A Fully-Integrated 77-GHz FMCW Radar Transceiver in 65-nm CMOS Technology," *IEEE Journal of Solid-State Circuits*, vol. 45, no. 12, pp. 2746-2756, December 2010, the contents of which are hereby incorporated herein by reference.

As derived in the expression for $R_{max}$ above, a small frequency difference between the transmitted tones may be used in some embodiments to obtain a long maximum unambiguous range. Meanwhile a large frequency difference may be used to obtain a small variance of the range estimation error, as shown in range error estimation expression above. Hence the competing requirements for a maximum range and for a small variance may be accommodated in some embodiments by using a three-different-frequency tone sequence $f_A$, $f_B$, $f_C$ as follows. $f_B$ can be chosen to be very close to $f_A$, while $f_C$ has a much larger separation from $f_A$ and $f_B$. Then the range estimations derived from the two pairs $(f_A, f_B)$ and $(f_B, f_C)$ can be combined to obtain improved performance: the first pair determines the maximum range and the second pair determines the variance of the range error. To estimate the speed of the target, two tones having equal frequencies may be used as described above, so the S-MFCW tone sequence of some embodiments as depicted in FIG. 2 may be repeated to obtain additional speed and range estimate measurements are desired. The resulting dwell time for one range measurement is DT=4T.

A Matlab simulation model is used to validate the proposed S-MFCW radar modulation and compare it to a typical FMCW radar. For both radars the time domain simulation uses dense sampling to generate the high frequency waveforms, while uses the respective sample frequency (Table 1) for the baseband signals. The Phased Array Toolbox has been used to generate and receive the waveform signals as well as to emulate the propagation and reflection on the target. The scenario is taken from the long range automotive radar. First the FMCW radar has been simulated using the same system parameters as in the above-referenced article (see Table 1). The variance on the speed and range error over 500 measurements have been simulated to be respectively 0.23 (m/s)$^2$ and 35 cm$^2$. Then the equations developed above are used to obtain the S-MFCW parameters that would give the same variance on the speed and range errors (see Table 1). To obtain the desired result, first we estimate the speed using a pair of tones having the same frequency ($f_A$). Then, two range estimations are calculated using:

$$\hat{R} = \frac{c(\Phi_j - \Phi_k)}{4\pi(f_j - f_k)} - \frac{\hat{v}}{2}\left(\Delta t_{max} - \frac{1}{f_s}\right) - \frac{\hat{v}}{2}T\left[\frac{(2j-1)f_j - (2k-1)f_k}{f_j - f_k}\right].$$

A coarse range ($R_{coarse}$) is determined by the close spaced frequency pair and ($f_A$, $f_B$) of tones 2 and 3. While a fine range ($R_{fine}$) is determined by the far-spaced frequency pair and ($f_B$, $f_C$) of tones 3 and 4. Next, the integer n that solves the equation:

$$n = \underset{n}{\mathrm{argmin}}(R_{coarse} - R_{fine} - n \cdot R_{max,34})$$

may be found, where $R_{max,34}$ represents the maximum range calculated using the 3rd and 4th tones. Finally the accurate target range can be found as:

$$R_{final} = n \cdot R_{max,34} + R_{fine}.$$

Using the presented sequence of tones and reconstruction method, the target can be detected at the maximum range set by the difference between $f_A$ and $f_B$, with the error set by the difference between $f_B$ and $f_C$. From the simulation results, the variance on the speed and range errors over 500 measurements are respectively 0.232 (m/s)$^2$ and 35.5 cm$^2$.

The simulation demonstrates that both S-MFCW and FMCW can detect targets that meet the long range automotive radar requirements. FMCW could detect targets even at a much longer distance (maximum distance in Table 1). But the S-MFCW modulation uses a much smaller bandwidth, a much shorter dwell time. In some embodiments where it may be desirable to decrease the power and circuitry area, the apparatus may be implemented without using a Fast Fourier Transform (FFT) processor. An FFT processor is typically an area and power consuming component, and embodiments implemented without an FFT processor is a hardware advantage especially for large scale integration, like phased arrays. As shown in Table 1, S-MFCW uses a bandwidth 32 times smaller and it is 15.6 times faster than the FMCW radar. Therefore some embodiments of the S-MFCW are a viable modulation scheme for real time imaging radar applications that often require short dwell time and low hardware complexity.

TABLE 1

Simulation Parameters, Results and Comparisons.

| | S-MFCW | FMCW |
|---|---|---|
| Target Maximum Distance | 150 m | ~112 Km |
| Target Maximum Speed | 46 m/s | 606 m/s |
| Target Initial Distance | 120 m | 120 m |
| Target Speed | −30 m/s | −30 m/s |
| Target Cross Section | 3 m$^2$ | 3 m$^2$ |
| Carrier Frequency | 77 GHz | 77 GHz |
| $\Delta f_{AB}$ | 1 MHz | N/A |
| $\Delta f_{BC}$ | 21 MHz | N/A |
| Bandwidth | 22 MHz | 700 MHz |
| Tone Period (T) | 24 µs | N/A |
| Dwell Tine (DT) | 96 µs | 1.5 ms |
| Samples ($N_a$) | 23 | N/A |
| FFT Points | N/A | 2048 |
| Sampling Rate ($f_s$) | 1 MHz | 3 MHz |
| SNR | 15 dB | 15 dB |
| $\sigma_{v_{err}}^2$ | 0.23 (m/s)$^2$ | 0.23 (m/s)$^2$ |
| $\sigma_{R_{err}}^2$ | 35 cm$^2$ | 35 cm$^2$ |

Further embodiments include a plurality of the receivers configured to process received signals from antennas arranged in an array wherein each of the plurality of receivers is configured to process a signal from an antenna array element. In further embodiments, each array element may be configured with a transceiver for generating and receiving signals from the respective element. The array and the transceivers may be configured to perform transmit beamforming, receive beamforming, or both.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may comprised one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:
1. A method of determining a speed and a range of an object comprising:
   generating at least a first, second, and third interval-specific tone phase signal by, during each of at least three successive time intervals:
      (i) generating and transmitting a tone towards an object during a respective time interval;

(ii) receiving an echo signal from the object during the respective time interval;

(iii) demodulating the respective echo signal using the generated tone to generate an interval-specific tone phase signal;

wherein at least two of the generated and transmitted tones are different frequencies;

determining at least a first, second and third interval-specific average phase value from the respective interval-specific tone phase signals;

determining a range estimate of the object and determining a speed estimate of the object using at least two phase differences between the at least first, second and third interval-specific average phase values.

2. The method of claim 1 wherein each of the three successive time intervals are equal in duration.

3. The method of claim 1 wherein at least two tones are of a same frequency, and the first interval-specific average phase value and the second interval-specific average phase value correspond to the at least two tones, and, wherein determining a range and determining a speed of the object further comprises determining the velocity based on a first phase difference between the first and second interval-specific average phase values.

4. The method of claim 3 wherein the at least two tones of a same frequency are transmitted in adjacent time intervals.

5. The method of claim 4 wherein the adjacent time intervals are of unequal duration.

6. The method of claim 3 wherein the at least two tones of a same frequency are transmitted in non-adjacent time intervals.

7. The method of claim 1 wherein generating at least a first, second, and third interval-specific tone phase signal further comprises generating a fourth interval-specific tone phase signal by, in a fourth time interval:

(i) generating and transmitting a fourth tone towards the object;

(ii) receiving a fourth echo signal from the object;

(iii) demodulating the fourth echo signal using the generated fourth tone to generate a fourth interval-specific tone phase signal;

wherein the fourth tone has a frequency different from any other transmitted tone;

determining a fourth interval-specific average phase value from the respective interval-specific tone phase signals;

and wherein determining a range estimate of the object comprised determining a coarse range estimate using at least two phase differences between the at least first, second and third interval-specific average phase values and determining a fine range estimate using a phase difference between the fourth interval-specific average phase value and one of the at least first, second and third interval-specific average phase values.

8. The method of claim 1 wherein determining the at least a first, second and third interval-specific average phase values comprises sampling each of the respective interval-specific tone phase signals over a predetermined interval and averaging the respective sample values.

9. A method comprising:

generating a first tone phase signal by demodulating a first echo signal from an object using a transmitted first tone having a first frequency;

measuring a first and second average phase value of the first tone phase signal at a first and second time offset, respectively;

determining a velocity estimate of the object based on a difference between the first and second average phase values and the first and second time offsets;

generating a second tone phase signal by demodulating a second echo signal from the object using a transmitted second tone having a second frequency different than the first frequency;

measuring a third average phase value of the second tone phase signal at a third time offset;

determining a range estimate of the object based on the velocity estimate and a difference between the third average phase value and at least one of the first and second average phase values.

10. The method of claim 9 further comprising:

generating a third tone phase signal by demodulating a third echo signal from an object using a transmitted third tone having a third frequency;

measuring a fourth average phase value of the third tone phase signal at a fourth time offset;

determining a revised range estimate of the object based on the velocity estimate and a difference between the fourth average phase value and at least one of the first, second, and third average phase values.

11. The method of claim 9 wherein the transmitted first tone is transmitted during a time interval that is substantially twice as long as a time interval during which the transmitted second tone is transmitted.

12. The method of claim 9 wherein the transmitted first tone is transmitted during two non-consecutive time intervals.

13. The method of claim 12 wherein the transmitted second tone is transmitted during a time interval between the two-non consecutive time intervals of the transmitted first tone.

14. An apparatus comprising:

a variable transmit tone generator configured to sequentially generate a plurality of transmit tones having at least two different frequencies for illuminating an object;

a receiver configured to sequentially demodulate a corresponding sequence of a plurality of echo signals and configured to sequentially generate a plurality of tone phase signals;

an analog to digital converter configured to sample the sequentially generated plurality of tone phase signals;

a processing device configured to determine a plurality of average phase values for each of the sampled sequentially generated plurality of tone phase signals, and configured to determine an object velocity estimate and an object range estimate based on differences between pairs of average phase values selected from the plurality of average phase values.

15. The apparatus of claim 14 wherein the processor is interconnected to the variable transmit tone generator and is further configured to generate a frequency control signal.

16. The apparatus of claim 14 wherein the receiver comprises an inphase/quadrature demodulator.

17. The apparatus of claim 14 wherein the processing device comprises a processor and a tangible memory storage device for storing computer-readable instructions.

18. The apparatus of claim 14 wherein the processor is configured to determine each of the plurality of average phase values at a predetermined time offset.

19. The apparatus of claim 14 wherein the processor is configured to determine the object velocity estimate based on a pair of average phase values of the plurality of average phase values, wherein the pair of average phase values correspond to a pair of tone phase signals corresponding to a pair of transmit tones having a same frequency.

20. The apparatus of claim 14 wherein the processor is further configured to determine the object range estimate using a coarse range estimate and a fine range estimate.

* * * * *